No. 657,942. Patented Sept. 18, 1900.
M. JURUICK.
ROLL HOLDING CAMERA.
(Application filed Nov. 21, 1899.)
(No Model.) 3 Sheets—Sheet 1.
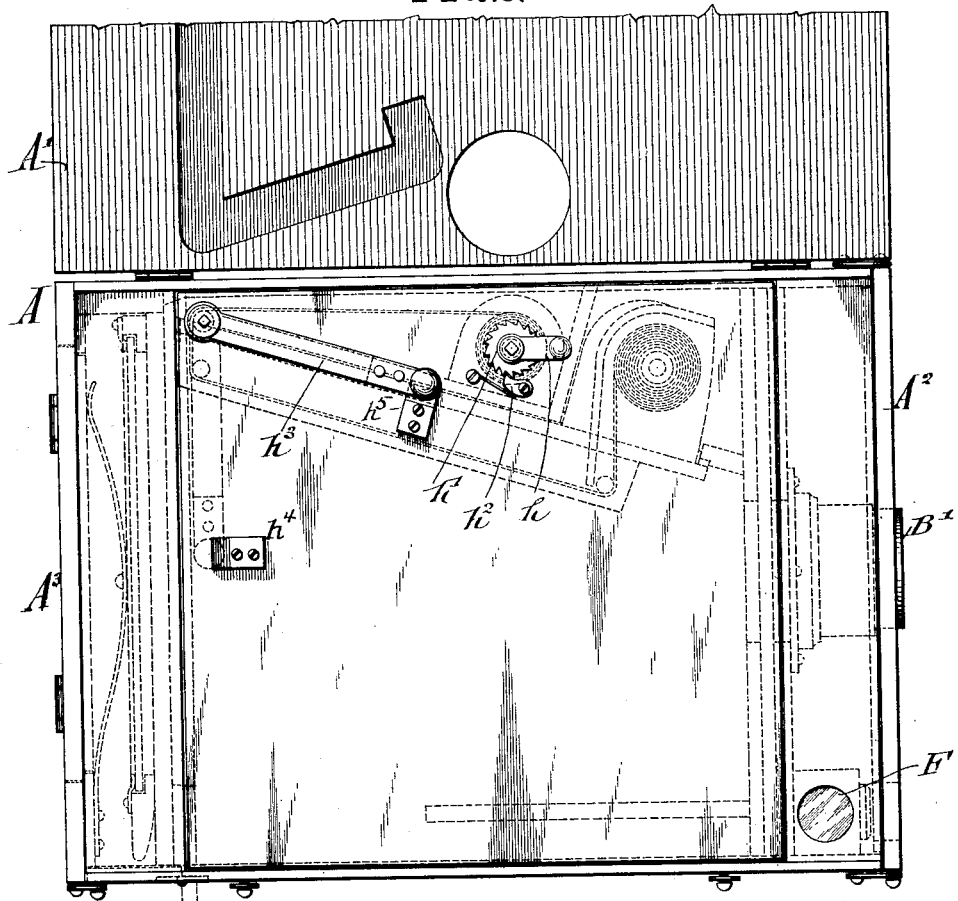
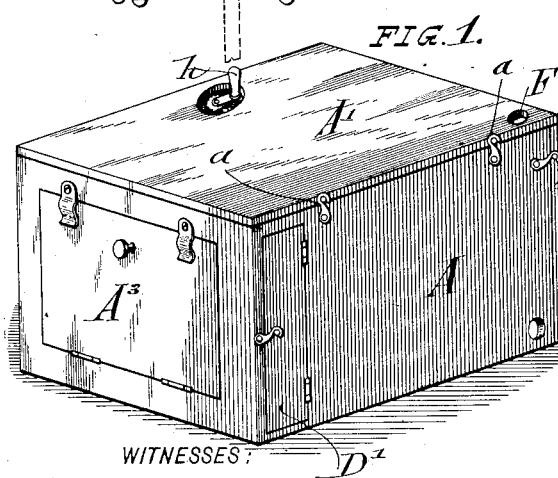
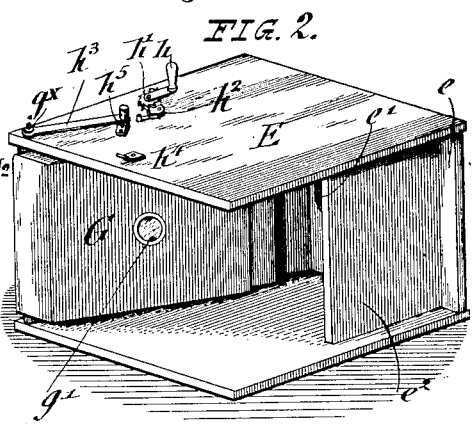
WITNESSES:
INVENTOR
Max Juruick
BY
ATTORNEYS No. 657,942. Patented Sept. 18, 1900.
M. JURUICK.
ROLL HOLDING CAMERA.
(Application filed Nov. 21, 1899.)

(No Model.) 3 Sheets—Sheet 2.

WITNESSES:

INVENTOR
Max Juruick
BY
ATTORNEYS

No. 657,942. Patented Sept. 18, 1900.
M. JURUICK.
ROLL HOLDING CAMERA.
(Application filed Nov. 21, 1899.)
(No Model.) 3 Sheets—Sheet 3.
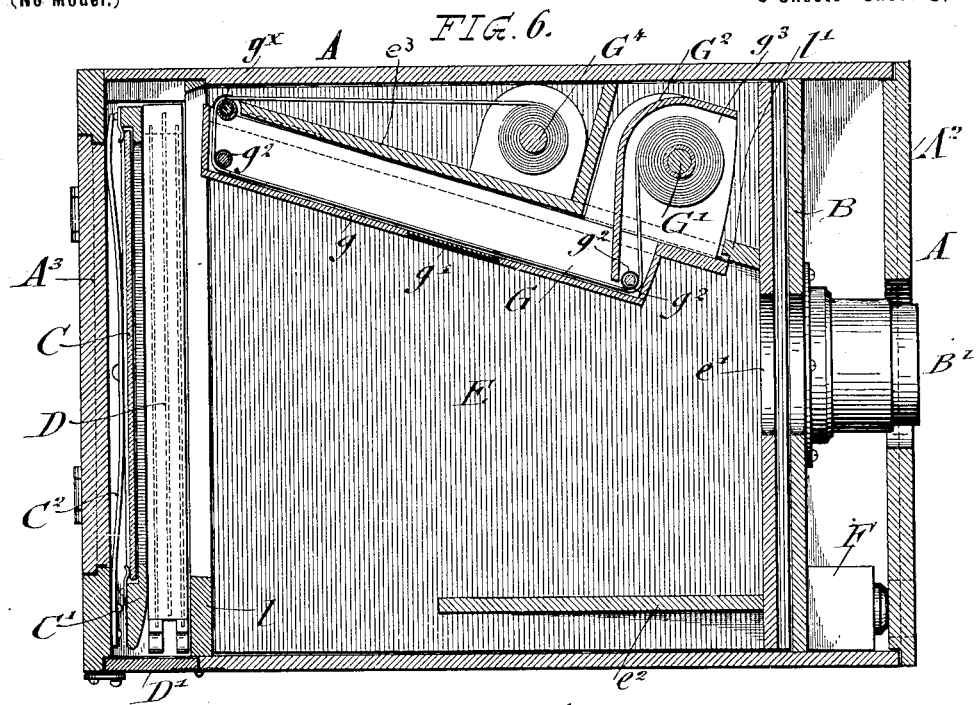
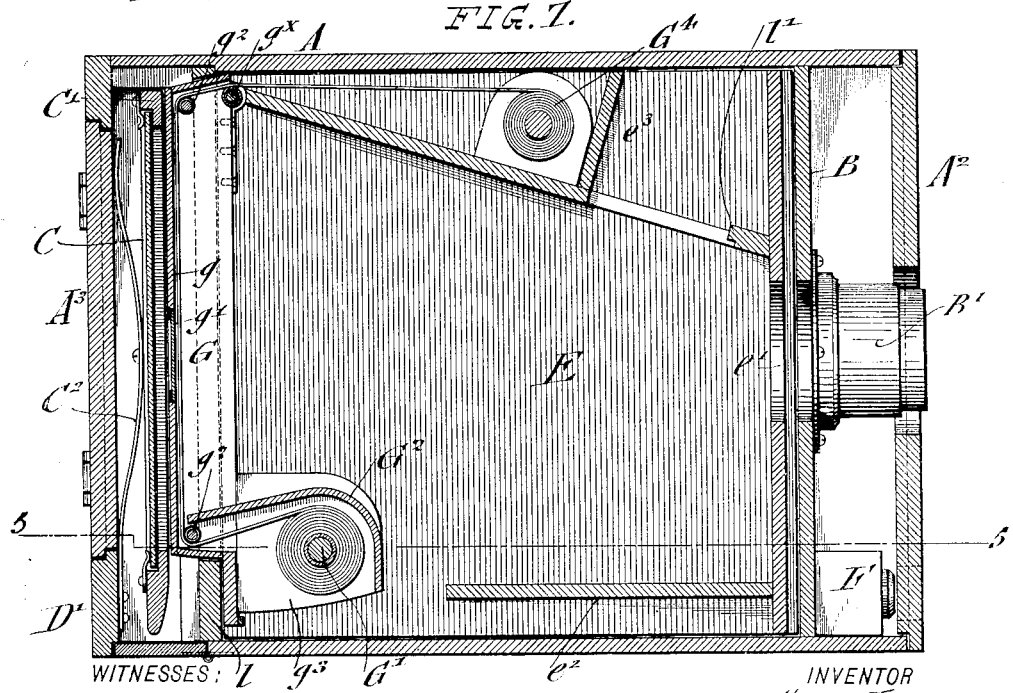
WITNESSES: INVENTOR
Max Juruick
BY
ATTORNEYS

UNITED STATES PATENT OFFICE.

MAX JURUICK, OF DEMAREST, NEW JERSEY.

ROLL-HOLDING CAMERA.

SPECIFICATION forming part of Letters Patent No. 657,942, dated September 18, 1900.

Application filed November 21, 1899. Serial No. 737,737. (No model.)

*To all whom it may concern:*

Be it known that I, MAX JURUICK, a citizen of the United States, residing in Demarest, in the county of Bergen and State of New Jersey, have invented certain new and useful Improvements in Photographic Cameras, of which the following is a specification.

This invention has reference to certain improvements in photographic cameras, and more especially to a camera which can be used in the ordinary manner in connection with a ground glass and plate-holder and also as a camera with a shiftable roll-holder arranged in such a manner in the camera that it can be moved opposite the lens whenever the camera is to be used as a roll-holder camera.

My invention consists of a photographic camera provided with a ground glass and constructed to receive a plate-holder and a shiftable roll-holder constructed to fold up toward one side of the camera when a dry-plate exposure is desired and for focusing on the ground glass for both exposures—that is to say, for exposure of dry-plate and sensitized film—without necessitating the removal of the roll-holder, whereby a combined roll-holder or film and a dry-plate camera is produced.

The invention consists, further, of means for adjusting the film on the roll-holder when the same is required for use, and, further, in certain details of construction which will be fully described hereinafter and finally pointed out in the claims.

Figure 5:
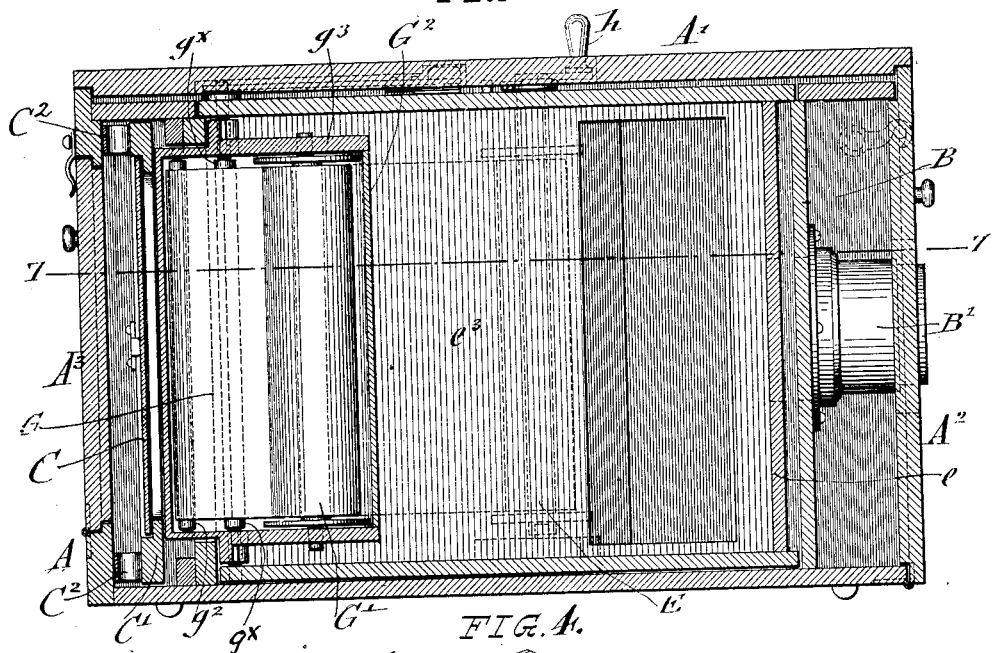
Figure 4:
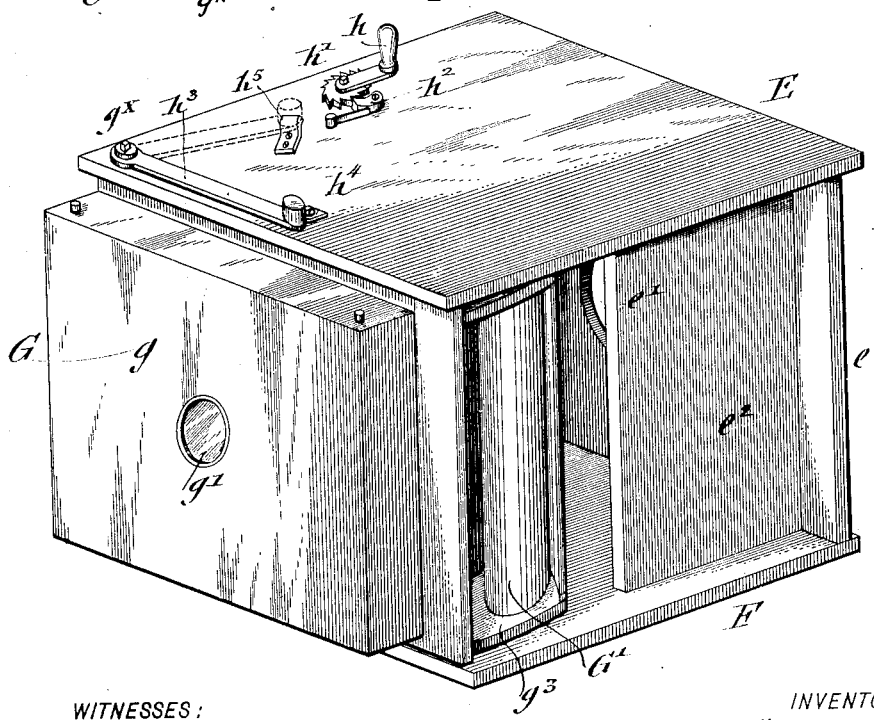

In the accompanying drawings, Figure 1 represents a perspective view of my improved photographic camera. Fig. 2 is a perspective view of the roll-holding box removed from the same and showing the same in folded position, so that the camera can be used in the ordinary manner. Fig. 3 is a plan view of my improved camera, showing the cover open, so as to disclose the parts below. Fig. 4 is a perspective view of a roll-holding box, showing the roll-holder in position for making pictures on the film. Fig. 5 is a vertical longitudinal section of the camera on line 5 5, Fig. 7. Fig. 6 is a horizontal section showing the roll-holder folded away at one side of its inclosing box; and Fig. 7 is a horizontal section on line 7 7, Fig. 5, showing the roll-holder in position for taking pictures on the same.

Similar letters of reference indicate corresponding parts.

Referring to the drawings, A represents the exterior box or casing of my improved photographic camera.

A' is a cover which is hinged to the box A and secured thereto by means of suitable fastening devices $a$. The box A is provided with hinged front and rear doors $A^2$ and $A^3$, which are moved into open position when the camera is to be used as an ordinary photographic camera. The front end of the exterior box A is provided with a partition B, which carries the lens-tube B' and also at the side of the same a finder F. At the rear end of the exterior box A is arranged a ground glass C, the frame C' of which is provided with a flat spring $C^2$, so as to press the ground glass forward against the plate-holder D when the camera is used with a plate-holder in the ordinary manner. The plate-holder D is introduced through an opening in the side of the box A, which opening is closed by a hinged door D', as shown in Fig. 1. Between the lens-tube and the ground glass C, at the rear part of the exterior box A, is arranged a detachable box E, which could be also stationary and provided with proper doors for giving access and which is composed of a front wall $e$, having an opening $e'$ in line with the lens-tube B', a side partition $e^2$, and an inclined angular partition $e^3$ at the opposite side of the box. To the side of this interior box E is hinged the frame of a swinging roll-holder G, which is formed of a partition $g$, having a central opening $g'$, closed by an orange or ruby colored glass, so that the film can be seen, and guide-rollers $g^2$ near the corners of the roll-holding frame, and a supporting-roller G', on which the film is wound, supported on bracket-shaped extensions $g^3$ of the roll-holding frame, said supporting-roller being protected by a curved guard-piece $G^2$, as shown in Figs. 6 and 7. The second film-roller $G^4$ is located in the angle formed by the angular partition $e^3$, so that the film when used is conducted from the supporting-roller G' over the guide-roller $g^2$, around the pivot $g^\times$, to the second or winding-up roller $G^4$, as shown clearly in Fig. 6. The winding-up roller $G^4$ passes through the top of the roll-holding box E and is provided at its upper end with a crank $h$ and a ratchet-wheel $h'$ on said crank and a spring-pawl $l^2$, engaging the ratchet-wheel, said crank serving to feed the film forward, so as to expose one section after the other to the action of the light in making film-pictures. The pivot of the roll-holder G is likewise extended through the top of the detachable box E and provided with a crank $h^3$, which can be moved from a spring-stop $h^4$ to a spring-stop $h^5$ when the roll-holder is to be moved from its position at the side of the box G, as shown in Figs. 2 and 6, to a position transversely across the rear end of the same and, vice versa, from its rear position to its side position, as shown in Figs. 4 and 7. The hinged top lid A' of the camera A is provided with an opening for the film-setting crank and with an opening for the finder F.

My improved photographic camera is used as follows: When the same is intended for use as an ordinary photographic camera, the ground glass is used in connection with a plate-holder, which is inserted in the usual manner in front of the ground glass, the roll-holder being swung over to the side of the camera, as shown in Figs. 2 and 6. The picture is then taken in the ordinary manner by first focusing the picture by means of the ground glass, next inserting the plate-holder, and then exposing. Whenever the pictures are to be taken on the film, the focusing on the ground glass can be done in the ordinary manner, the roll-holder is turned on its pivot so that the section of the film to be exposed takes the place of the ground glass and is placed across the rear end of the camera. In such event the finder need not be used, as a better image will be projected on the ground glass. The inclosing box is provided with a ledge $l$ at one side and with a ledge $l'$ near the lens-tube, said ledges serving as supports against which the roll-holding frame abuts when the same is either in its position at the rear or side of the roll-holder box E. The plate-holder is removed when film-pictures are to be taken, the successive sections of the film which are exposed being indicated through the glass-covered opening $g'$ in the rear end of the roll-holder frame. The film is moved forward by crank $h^3$, so as to bring one section after the other under the influence of the lens-tube during exposure. When the camera is to be used in the ordinary manner with a plate-holder, the roll-holding box can be entirely removed and left at home, but when either film-pictures or ordinary pictures are to be taken the roll-holding box is inserted and carried along, the roll-holding frame being moved across the rear end of the roll-holding box whenever film-pictures are to be made. In this manner the photographic camera can be made use of for taking ordinary pictures on sensitized glass plates, as well as for making film-pictures, whereby the value of the same is considerably enhanced and the necessity of having two different cameras, one for one and the other for the other purpose, is dispensed with.

Having thus described my invention, I claim as new and desire to secure by Letters Patent—

1. The combination, with a photographic camera having a lens-tube and a ground-glass plate, of means for movably supporting a sensitive film within the camera between the lens and the ground-glass plate, so that it may be moved to position at one side of the interior of the camera or transversely of the same, and means for adjusting said film to expose an unused portion, substantially as set forth.

2. The combination, with a photographic camera, of a folding roll-holder between the lens-tube and ground glass, means for turning the movable portion of the roll-holder from the position at the side of the box to the rear end of the same, and means for adjusting the film, substantially as set forth.

3. In a photographic camera, the combination, with an ordinary camera having a lens-tube and ground glass, of a roll-holder box open at its rear end and inserted into the main box of the camera, the roll-holder being adapted to be moved sidewise at the side of the main box or transversely across the rear end of the same, so that the camera can be used either as an ordinary camera or for film-pictures, substantially as set forth.

4. In a photographic camera, a roll-holder box, a roll-holder having a swinging portion pivoted to one corner of said box, means for moving said portion to one side or transversely across the box, and means for adjusting the film of said roll-holder, substantially as set forth.

5. In a photographic camera, the combination of a roll-holder box having an angular partition at one side of the same, a roll-holding frame pivoted to one corner of said box, means for arresting said roll-holder frame when turned toward the side or end of the box, a supporting-roller in the movable frame, a winding-up roller in the angular partition of the box, means for moving the roll-holding frame from a position sidewise to a position at the rear end of the roll-holding box, and means acting on said winding-up roller for moving the film so as to subject one section after the other to the light, substantially as set forth.

In testimony that I claim the foregoing as my invention I have signed my name in presence of two subscribing witnesses.

MAX JURUICK.

Witnesses:
PAUL GOEPEL,
M. HENRY WURTZEL.